July 7, 1953     E. S. GNIADECKI     2,644,649

FISHING LINE DRYING REEL

Filed Sept. 22, 1952     2 Sheets-Sheet 1

INVENTOR.
Edward S. Gniadecki.
BY
Attorney.

July 7, 1953 E. S. GNIADECKI 2,644,649
FISHING LINE DRYING REEL
Filed Sept. 22, 1952 2 Sheets-Sheet 2
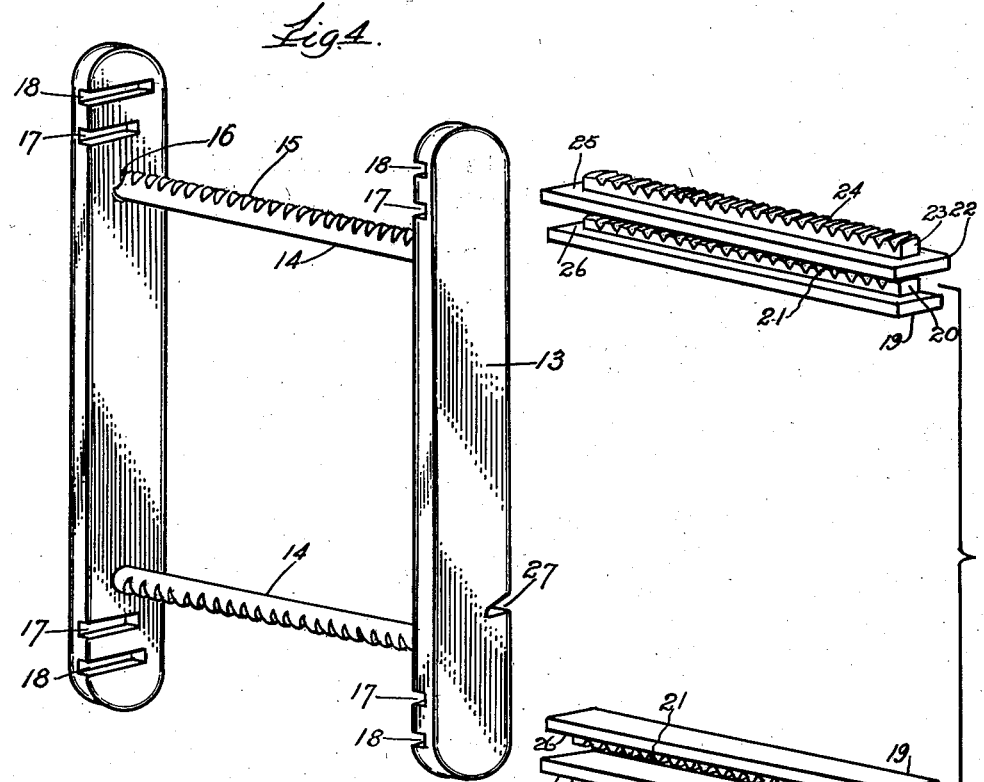
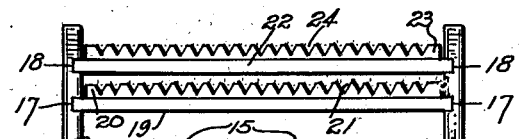
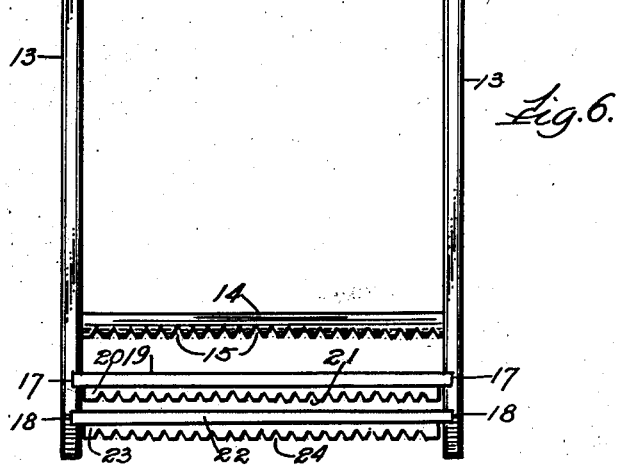
INVENTOR.
Edward S. Gniadecki
BY
Attorney.

Patented July 7, 1953

2,644,649

UNITED STATES PATENT OFFICE 2,644,649

FISHING LINE DRYING REEL

Edward S. Gniadecki, Chicago, Ill.

Application September 22, 1952, Serial No. 310,831

12 Claims. (Cl. 242—104)

My invention relates to fishing line drying reels to be utilized primarily for winding thereupon fishing lines of the type utilized to cast out light weight flies, and adapted to receive a length of fishing line in a series of windings, arranged so as to maintain the coils of each particular winding out of contact perimetrically with the coils of the other windings.

An important object of my invention is to provide a fishing line drying reel of the aforementioned character which will permit winding thereupon a number of windings; each winding being out of contact with the remaining windings so as to permit currents of air to circulate therethrough as well as permeate therethrough in order to quickly dry the line.

A still further object of my invention is to provide a fishing line drying reel of the aforementioned character which is made up of a substantially quadrilateral structure having extensions provided with mortise means to receive in the said mortise means, winding support means, which may be removably attached thereto in order to facilitate the winding on, and unwinding therefrom, a fishing line.

A further object of my invention is to provide, in a line drying reel of the aforementioned character, means for initially holding a line preparatory to winding the same on the reel for drying purposes, also means for holding the remaining terminal portion of the fishing line when the entire line has been wound on the fishing reel.

A still further object of my invention is to provide a line winding drying reel of the aforementioned type, which may be carried in the pocket, fishing box or kit, and an article which is of such simple, compact and elemental construction as to warrant economical manufacture thereof in quantity production.

Other objects and advantages inherent in my invention will become apparent from an examination of the accompanying drawings, bearing further elucidation in the ensuing description, wherein like symbols are utilized to designate like parts, and in which:

Fig. 4 is a perspective view of the body element comprising an important part of the structural arrangement of parts included to form my invention.

Fig. 5 illustrates in perspective the removable coiled winding elements that are removably insertable in the mortise means provided on the extensions of two laterals of the body element comprising my invention.

Fig. 6 illustrates how the coil winding elements are mounted in the body element.

Figure 1:
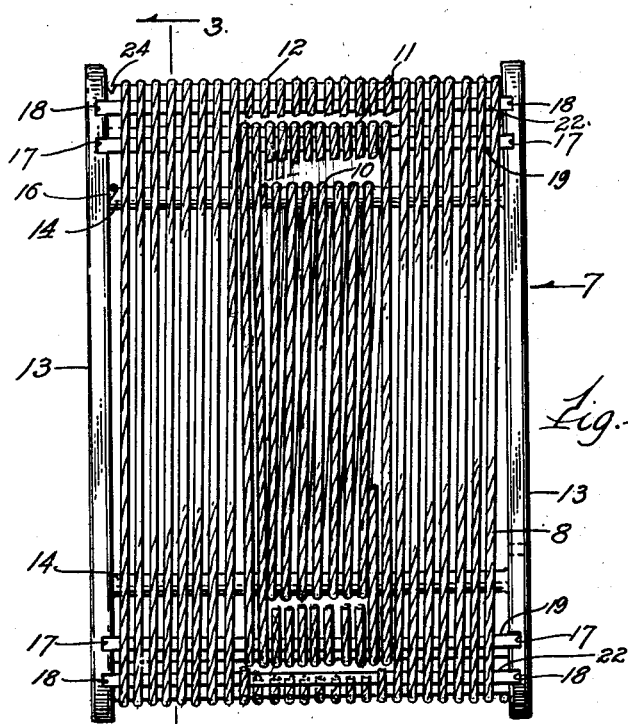
Fig. 1 is a front view of my invention with certain sections of fishing line windings cut away in order to more clearly elucidate the structural arrangement of the coils of each winding of fishing line wound thereupon.
Figure 2:
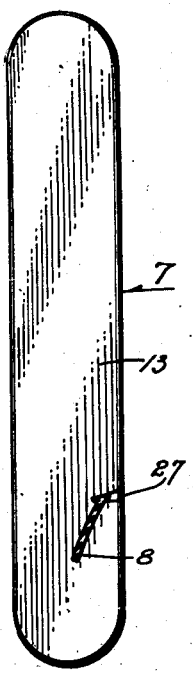
Fig. 2 is an end view of Fig. 1.
Figure 3:
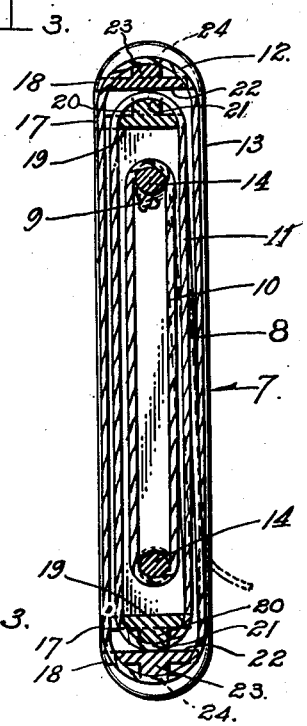
Fig. 3 is a longitudinal cross-sectional view taken, substantially, on the lines 3—3 of Fig. 1.

Referring to the various views, my invention is, generally, designated T and consists of a body element having two laterals 13 connected by cross members 14; the entire device being made up of a plastic material or composition so that it may be suitably molded to shape in one operation. The laterals 13 are provided with mortise cuts 17 and 18; the mortised cut 18 being of a greater depth than the mortise cut 17 as will hereinafter become apparent from the description. The cross portions 14 are provided with V-grooves 15 in order to permit winding the fishing line 8 thereupon. One cross portion 14 is provided with the initial catch or groove 16 for holding the terminal portion 9 of the line 8, which may be suitably knotted, in order to form good anchorage so as to permit winding the coils 10 on the grooves 15.

After the coils 10 have been wound laterally across the portions 14, the coil winding elements 19 are inserted into the mortised openings 17, and then the line is wound on the V-grooves 24 so as to maintain each coil separate, to permit currents of air to permeate therebetween, to effectuate a quick-drying action.

It will be noted that the width of the base of the element 19 is smaller than the width of the element 22, otherwise they are of the same magnitude and construction. The element 19 is provided with an extended portion 20 centrally and longitudinally thereof, which is provided with grooves 21 to receive the winding 11, whereas the element 22 is provided with the extended portion 23 having grooves 24 in order to receive the winding 12.

After the winding 11 is completely wound on the elements 19 then elements 22 are inserted and the winding continues until the terminal portion 14 of the line 8 is secured in the notch 27 holding the same intact and permitting drying. The reel may also be carried in the pocket or fishing tool kit preparatory for use on the next fishing trip.

It will be noted that the extended portions 20 and 24, respectively, of the elements 19 and 22 are shorter in order to leave spaces 25 and 26 so that the elements 19 and 22 may be compactly assembled in frictional engagement in the mortises 17 and 18 and yet permit removability thereof. When the reel is empty, it may be assembled as indicated in Fig. 6.

In order to wind fishing line thereupon the elements 19 and 20 are removed from their assembly to the body 13 at the top and bottom, and, as seen in Fig. 4, the line winding operation is initiated at 16 and the coils wound within the grooves 15. As soon as all of the grooves are filled with line 8 then elements 19 are inserted at top and bottom of the mortises 17 and the winding continues to form the winding 11 on elements 19, and when elements 19 are filled with coils or line windings then the elements 22 are inserted and the winding continues to form the line winding 12.

It will be noticed that throughout their perimetrical portions, the windings 10, 11 and 12, are free from contact with one another so as to allow the air to pass therethrough and the V-portions 15, 21 and 24 also provide space between individual coils in each winding section so as to permit currents of air to pass all around the individual strands of line, and thus effectuate a quick drying operation.

Although the drawings and the above specification disclose the best modes in which I have contemplated embodying my invention, I desire to be in no way limited to the details of such disclosure, for in the further practical application of my invention many changes in the form and construction thereof may be made as circumstances require or experience suggests without departing from the spirit of the invention as expounded within the scope of the appended claims.

Having thus described and revealed my invention, what I claim as new and desire to secure by Letters Patent is:

1. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, and secondary coil winding means fitted removably to the other pair of the said mortised portions.

2. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, and secondary coil winding means fitted removably to the other pair of the said mortised portions, the said primary coil winding means and the said secondary coil winding means being provided with fishing line groove locating means.

3. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, and secondary coil winding means fitted removably to the other pair of the said mortised portions, the said primary coil winding means being narrower than the said secondary coil winding means.

4. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, and secondary coil winding means fitted removably to the other pair of the said mortised portions, the said primary coil winding means and the said secondary coil winding means being provided with fishing line groove locating means, the said primary coil winding means being narrower than the said secondary coil winding means.

5. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, secondary coil winding means fitted removably to the other pair of the said mortised portions, and notched means on one of the said coil winding portions for holding releasably one terminal portion of a fishing line.

6. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, secondary coil winding means fitted removably to the other pair of the said mortised portions, the said primary coil winding means and the said secondary coil winding means being provided with fishing line groove locating means, and notched means on one of the said coil winding portions for holding releasably one terminal portion of a fishing line.

7. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, secondary coil winding means fitted removably to the other pair of the said mortised portions, the said primary coil winding means being narrower than the said secondary coil winding means, and notched means on one of the said sides adapted to engage releasably a terminal portion of the said fishing line.

8. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, secondary coil winding means fitted removably to the other pair of the said mortised portions, the said primary coil winding means and the said secondary coil winding means being provided with fishing line groove locating means, the said primary coil winding means being narrower than the said secondary coil winding means, and notched means on one of the said sides adapted to engage releasably a terminal portion of the said fishing line.

9. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, secondary coil winding means fitted removably to the other pair of the said mortised portions, notched means on one of the said coil winding portions for holding releasably one terminal portion of a fishing line, and notched means on one of the said sides adapted to engage releasably the other terminal portion of the said fishing line.

10. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, secondary coil winding means fitted removably to the other pair of the said mortised portions, the said primary coil winding means and the said secondary coil winding means being provided with fishing line groove locating means, and notched means on one of the said coil winding portions for holding releasably one terminal portion of a fishing line, and notched means on one of the said sides adapted to engage releasably the other terminal portion of the said fishing line.

11. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, secondary coil winding means fitted removably to the other pair of the said mortised portions, the said primary coil winding means being narrower than the said secondary coil winding means, and notched means on one of the said sides adapted to engage releasably a terminal portion of the said fishing line.

12. Fishing line drying reel means, comprising a body element including a pair of sides interconnected by coil winding portions provided with fishing line groove locating means, the said sides being provided with extensions having on their inner portions pairs of mortised portions of uneven depth, primary coil winding means fitted removably to one pair of the said mortised portions, secondary coil winding means fitted removably to the other pair of the said mortised portions, the said primary coil winding means and the said secondary coil winding means being provided with fishing line groove locating means, the said primary coil winding means being narrower than the said secondary coil winding means, and notched means on one of the said sides adapted to engage releasably a terminal portion of the said fishing line.

EDWARD S. GNIADECKI.

No references cited.